April 16, 1963 T. L. CHARLAND ETAL 3,086,068

PROCESS FOR THE PREPARATION OF THERMOELECTRIC ELEMENTS

Filed June 10, 1959

WITNESSES

Edwin C. Bassler

Charles L. Menzemer

INVENTORS

Telesphore L. Charland

& Robert H. Moss

BY

Frederick Shapoe

ATTORNEY

United States Patent Office 3,086,068
Patented Apr. 16, 1963

3,086,068

PROCESS FOR THE PREPARATION OF THERMOELECTRIC ELEMENTS

Telesphore L. Charland and Robert H. Moss, Pittsburgh, Pa., assignors to Westinghouse Electric Corporation, East Pittsburgh, Pa., a corporation of Pennsylvania Filed June 10, 1959, Ser. No. 819,305
11 Claims. (Cl. 136—5)

This invention relates to a new and improved process for the preparation of thermoelectric elements.

In the past thermoelectric materials have generally been prepared by one of two processes: (1) Single crystal growth, as for example by the Bridgeman technique, and, (2) Casting.

The single crystal growth process is costly, difficult to control and has other shortcomings known to those skilled in the art.

The casting process produces polycrystalline materials having a coarse grain structure which are generally brittle, have a low thermoelectric efficiency and other shortcomings known to those skilled in the art.

In addition to these shortcomings, certain materials, for example, powdered intermetallic materials which are not readily reducible such as groups III and V intermetallic compounds and zinc antimonide, because of their physical or chemical properties, do not lend themselves readily to either of the prior art processes.

For example, of the zinc antimonide compounds ($Zn_4Sb_3$, $Zn_3Sb_2$, and ZnSb), the compound ZnSb is the only one which exhibits sufficient stability to be useful as a thermoelectric element. The compounds $Zn_4Sb_3$ and $Zn_3Sb_2$ exhibit a higher Seebeck coefficient than ZnSb, but are physically unstable due to thermolytic migration of zinc ions. This migration causes a deterioration in the thermoelectric efficiency of the element.

In the past, ZnSb thermoelectric elements have been prepared by melting and casting molten mixtures of zinc and antimony. Upon cooling of these cast elements, a phase segregation takes place which produces an unstable thermoelectric element. Upon cooling, the ZnSb composition forms the compound $Zn_4Sb_3$ and the eutectic mixture ZnSb+Sb. As stated above, the $Zn_4Sb_3$ is unstable. To overcome this instability and convert the $Zn_4Sb_3$ into the stable ZnSb, it has been necessary in the past to anneal the cast elements at approximately 480° C. for about 24 hours. Even after this time-consuming annealing step, the elements so produced are usually extremely brittle.

The surprising discovery has now been made that thermoelectric elements can be prepared from powdered intermetallic materials, which are not readily reducible, by compacting and sintering under certain predetermined conditions. The thermoelectric elements thus prepared have thermoelectric and physical properties greatly improved over similar elements prepared by the prior art processes.

An object of the present invention is to provide a new and improved process for the preparation of thermoelectric elements from powdered intermetallic materials.

Another object of the present invention is to provide a new and improved process for the preparation of thermoelectric elements from powdered intermetallic materials by hot pressing.

Another object of the present invention is to provide a process for the preparation of thermoelectric elements from powdered intermetallic materials by compacting and sintering the powders in specified proportions.

Another object of the present invention is to provide a new and improved process for combining thermoelectric intermetallic materials and a doping material by compacting and sintering to produce a suitably doped thermoelectric element.

Another object of the present invention is to provide a new and improved process for the preparation of thermoelectric elements from powdered zinc and antimony by hot pressing.

Another object of the present invention is to provide a new and improved process for the preparation of thermoelectric elements from powdered zinc and antimony by compacting and sintering the powders in specific proportions.

Another object of the present invention is to provide an improved thermoelectric device embodying at least one element produced by compacting and sintering powdered intermetallic materials.

Other objects will, in part, appear hereinafter and will, in part, be obvious.

For a better understanding of the nature and objects of the present invention, reference should be had to the following detailed description and drawings, in which.

In accordance with the present invention and attainment of the foregoing objects, there is provided a process for preparing an improved thermoelectric element from intermetallic materials, comprising (1) admixing predetermined amounts of at least two powdered intermetallic materials, (2) sintering the admixture in an inert atmosphere under predetermined conditions, and (3) compacting the admixture, under high pressure, into a desired configuration. The compacting may be carried out in a hot press, or in a cold press followed by sintering.

The process of this invention may be applied in the preparation of thermoelectric elements embodying selected amounts of doping materials and additions to improve the physical characteristics of the thermoelements. In such cases, the doping material or other additive is admixed in a predetermined proportion with the intermetallic powder. Tin, silver, iron and aluminum, which are frequently employed as doping agents or to improve the physical properties of the element, lend themselves readily to the process of this invention.

For purposes of clarity, the process of this invention will be described in terms of preparing a p-type ZnSb thermoelectric element.

Figure 1:
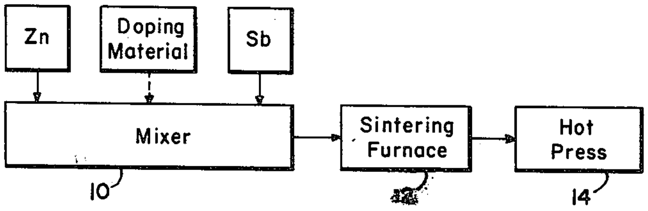
FIG. 1 is a schematic view in diagrammatic form illustrating the process of this invention.

More specifically and with reference to FIG. 1, zinc and antimony, in powdered form and in substantially stoichiometric proportions, 33% to 36%, by weight, zinc and 67% to 64%, by weight, antimony, are charged into a suitable mixer or blender 10 and admixed to a state of homogeneity.

The time necessary to ensure homogeneity of the mixture is dependent upon the quantity of materials being admixed and the size of the mixer used.

The particle size may vary from −200 mesh to −325 mesh (U.S. Standard Sieve). Very satisfactory results have been achieved employing powders of intermetallic compounds having a particle size of −200 mesh.

If it is desired to produce a doped thermoelectric element, the doping material also similarly finely divided, is charged into the mixer with the zinc and antimony powders.

Examples of suitable doping agents and additives for zinc antimonide thermoelectric elements include at least one of the metals selected from the group consisting of tin, silver and aluminum. The quantity of doping material employed will be dependent upon the thermoelectric properties desired and may vary based upon the total weight of the components, of from 1% to 4%, tin, and from 0.1% to 0.5% of silver. Particularly satisfactory zinc antimonide thermoelements have been prepared comprising (1) 2%, by weight, tin, (2) 0.5%, by weight, silver, and (3) 1%, by weight, tin, and 0.1% by weight silver, the balance in each case being zinc and antimony.

After admixing, the zinc-antimony admixture, with or without suitable doping material, is charged into a sintering furnace 12 and sintered for from 2 hours to 15 hours in an inert atmosphere at a temperature of from 400° C. to 525° C. Particularly satisfactory thermoelectric elements have been prepared from admixtures sintered at 500° C. for from 2 to 10 hours in an argon gas atmosphere.

The zinc-antimony mixture is then pressed into a desired shape in a hot press 14. The press 14 is operated at a temperature within the range of 480° C. to 520° C., a pressure within the range of 1 ton per in.$^2$ to 2½ tons per in.$^2$ in an inert atmosphere, for example, an argon atmosphere.

Figure 2:
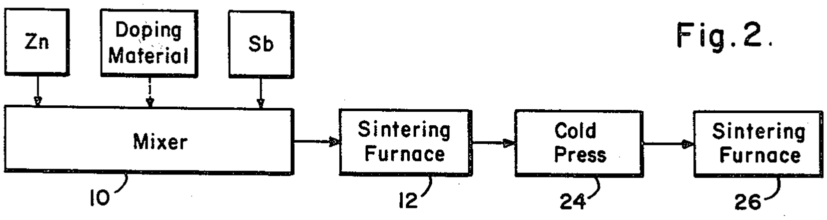
FIG. 2 is a schematic view in diagrammatic form illustrating a modification of the process of this invention.

In a modification of the process described above, and with reference to FIG. 2, the zinc-antimony mixture upon being discharged from the sintering furnace 12 may be compacted in a cold press 24 and then sintered in a furnace 26. In this latter operation the press 24 is operated at a pressure of from about 50 to 100 tons per in.$^2$ and higher.

The sintering of the cold pressed compacts is carried out in an inert atmosphere, for example, an argon atmosphere, at a temperature of from 480° C. to 520° C. for from 2 hours to 15 hours.

Figure 3:
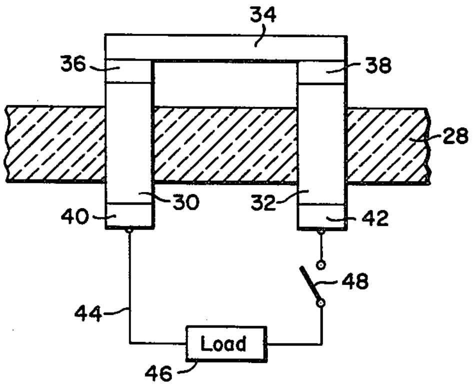
FIG. 3 is a view, partially in cross section, of a thermoelectric device comprised of a p-type ZnSb element prepared in accordance with the teaching of this invention.

With reference to FIG. 3 of the drawing, there is illustrated a thermoelectric device suitable for producing electric current from heat. A thermally insulating wall 28 so formed as to provide a suitable furnace chamber is perforated to permit the passage therethrough of a positive zinc antimonide thermoelement member 30 and a negative thermoelement member such as indium arsenide 32. An electrically conducting strip of metal 34, for example, copper, silver or the like, is joined to an end face 36 of the member 30 and end face 38 of member 32 within the chamber so as to provide good electrical and thermal contact therewith. The end faces 36 and 38 may be coated with a thin layer of metal, for example by vacuum evaporation or by use of ultrasonic brazing whereby good electrical contact is obtained. The metal strip 34 may be provided with suitable fins or other means for conducting heat thereto from the furnace chamber in which it is disposed.

At the other end of the member 30, located on the other side of the wall 28, there is attached a metal plate or strip 40 by brazing or soldering in the same manner as employed in attaching strip 34 to the end face 36. Similarly, a metal strip or plate 42 may be connected to the other end of member 32. The plates 40 and 42 may be provided with heat dissipating fins or other cooling means whereby heat conducted thereto may be dissipated. The surface of the plates 40 and 42 may also be cooled by passing a current of a fluid such as water across their surfaces.

An electrical conductor 44 in circuit with a load 46 is electrically connected to the end plates 40 and 42. A switch 48 is interposed in the conductor 44 to enable the electrical circuit to be opened and closed as desired. When the switch 48 is moved to the closed position an electric current flows between members 30 and 32 and energizes the load 46.

It will be appreciated that a plurality of pairs of the positive and negative members may be joined in series in order to produce a plurality of cooperating thermoelements. In a similar manner each of the thermoelements will be disposed with one junction in a furnace or exposed to any other source of heat while the other junction is cooled by applying water or blowing air thereon. Due to the relative difference in the temperature of the junctions, an electrical voltage will be generated in the thermoelements. By joining a plurality of the thermoelements in series, direct current at any suitable voltage will be generated.

While the process of this invention has been described relative to ZnSb and ZnSb thermoelectric elements, it will be understood that the teachings of this invention are applicable to the preparation of other intermetallic materials and the fabrication of these materials into thermoelectric elements. For example, the teachings of this invention have been employed to prepare thermoelectric elements comprised of from 91% to 98%, by weight, indium antimonide, and 9% to 2%, by weight, indium arsenide, and elements comprised of cadmium antimonide.

In the preparation of this particular InSb-InAs element by the hot press method, the powdered admixture was (1) sintered at a temperature within the range of from 480° C. to 520° C. in an inert atmosphere for from 2 to 10 hours and (2) pressed into ½ inch by ½ inch pellets at a pressure within the range of 3000 to 5000 p.s.i and a temperature of from 500° C. to 525° C. In forming the pellets by the cold press method, the powders were sintered as described above, pressed into ½ inch by ½ inch pellets with a pressure within the range of from 50 to 100 tons per square inch and then sintered at a temperature within the range of from 480° C. to 520° C. for from 2 to 10 hours.

In the preparation of pellets from other suitable intermetallic materials, it will be understood that the sintering temperatures and compacting pressures will vary depending upon the material. In general, however, the sintering should be carried out at a temperature 20° C. to 100° C. below the melting point of the compound, that is, sintering should be in the plastic deformation temperature range of the material. The compacting pressure is dependent on the material and the desired density of the compact.

The following examples are illustrative of the practice of this invention and set forth the advantages thereof; all parts and percentages are by weight.

*Example I*

A composition of matter comprised of compactible particles having a particle size of −200 mesh (U.S. Standard Sieve) and being made up of:

| | Percent |
|---|---|
| Zinc | 34.60 |
| Antimony | 64.30 |
| Tin | 1.00 |
| Silver | 0.10 |

was charged into a conical cone blender and admixed for a period of approximately two hours to ensure homogeneity.

The admixture was then sintered in an argon atmosphere at a temperature of approximately 500° C. for approximately five hours.

The sintered mass was then pressed into pellets ½ inch in diameter and ½ inch long in a press wherein the die was at a temperature of approximately 520° C. and under a pressure of approximately 5000 p.s.i

*Example II*

The procedure of Example I was repeated, except that the ½ inch pellets were formed in a cold press under a pressure of 50 tons per square inch.

The pellets were then sintered in an argon atmosphere for 2 hours at a temperature of 500° C.

*Example III*

A zinc antimonide thermoelectric pellet having a diameter of ½ inch and a length of ½ inch, comprised of:

| | Percent |
|---|---|
| Zinc | 34.60 |
| Antimony | 64.30 |
| Tin | 1.00 |
| Silver | 0.10 |

was prepared by the prior art method of melting and casting. After casting the melt into pellets, they were cooled to 480° C. and annealed at this temperature for 24 hours.

*Example IV*

An indium antimonide alloy comprised of:

| | Percent |
|---|---|
| Indium | 48.52 |
| Antimony | 51.48 |

and an indium arsenide alloy comprised of:

| | Percent |
|---|---|
| Indium | 60.50 |
| Arsenic | 39.50 |

were prepared by melting and casting.

The two alloys were milled separately until each had a particle size of −200 mesh (U.S. Standard Sieve).

A homogeneous powdered admixture comprised of 97.99% of the indium antimony powder and 2.01% of the indium-arsenic powder was prepared.

The admixture was sintered for 5 hours in a helium atmosphere at 500° C. and then compacted into ½ inch by ½ inch pellets under a pressure of 4000 p.s.i and at a temperature of 525° C.

The pellets had good thermoelectric and physical properties.

The electrical properties of the thermoelements prepared in accordance with the procedures of Examples I, II, and III were determined and are set forth below.

TABLE

| Pellet | Resistivity (ohm-cm. $\times 10^{-3}$) | Thermal E.M.F. (Microvolts/° C.) | Thermal Conductivity (Watts/ cm., ° C.) | Figure of Merit |
|---|---|---|---|---|
| Exp. I | 2.95 | 198.1 | .0283 | 8.51 |
| Exp. II | 2.1 | 157.8 | .0252 | 7.97 |
| Ex. III (Prior Art) | 13 | 210 | 0.020 | 2.6 |

The figure of merit was calculated using the equation:

$$M=\frac{T_h}{4}\frac{\alpha^2}{\rho K}$$

wherein:

$M$=Figure of merit
$\alpha$=Thermoelectric power (v./° C.)
$\rho$=Resistivity (ohm-cm.)
$K$=Thermal conductivity (watts/cm. ° C.)
$T_h$=Hot junction temperature (450° C. for these tests).

The unusual results obtained by the practice of the present invention can be clearly seen from a comparison of the figure of merit of thermoelectric elements prepared in accordance with this invention and those of the prior art.

While the invention has been described with reference to particular embodiments and examples it will be understood, of course, that modifications, substitutions and the like may be made without departing from its scope.

We claim as our invention:

1. A process for preparing a thermoelectric element comprised of a compacted homogeneous intermetallic compound selected from the group consisting of indium antimonide, indium arsenide, cadmium antimonide and zinc antimonide, comprising, admixing predetermined amounts of two finely powdered metals to form an intermetallic compound selected from the group consisting of indium antimonide, indium arsenide, cadmium antimonide and zinc antimonide, sintering the admixture in an inert atmosphere at a temperature 20° C. to 100° C. below the melting point of the intermetallic compound for from 2 to 15 hours, and compacting the sintered admixture under sufficient pressure and heat to form a compact of desired density and configuration.

2. A process for preparing a thermoelectric element comprised of a compacted homogeneous intermetallic compound selected from the group consisting of indium antimonide, indium arsenide, cadmium antimonide and zinc antimonide, comprising, admixing predetermined amounts of two finely powdered metals to form an intermetallic compound selected from the group consisting of indium antimonide, indium arsenside, cadmium antimonide and zinc antimonide, sintering the admixture in an inert atmosphere at a temperature 20° C. to 100° C. below the melting point of the intermetallic compound for from 2 to 15 hours, and compacting the sintered admixture at a temperature 20° C. to 100° C. below the melting point of the intermetallic compound and a pressure within the range of 2000 p.s.i. to 5000 p.s.i. to a desired configuration and density.

3. A process for preparing a thermoelectric element comprised of a compacted homogeneous intermetallic compound selected from the group consisting of indium antimonide, indium arsenide, cadmium antimonide and zinc antimonide, comprising, admixing predetermined amounts of two finely powdered metals to form an intermetallic compound selected from the group consisting of indium antimonide, indium arsenide, cadmium antimonide and zinc antimonide, sintering the admixture in an inert atmosphere at a temperature 20° C. to 100° C. below the melting point of the intermetallic compound for from 2 to 15 hours, compacting the sintered admixture at a pressure of 50 to 100 tons per square inch to a desired configuration and density, and then sintering for from 2 to 15 hours at a temperature 20° C. to 100° C. below the melting point of the compact.

4. A process for preparing a zinc antimonide thermoelectric element comprising admixing substantially stoichiometric amounts of zinc and antimony in finely powdered form, sintering the admixture in an inert atmosphere at a temperature of from 400° C. to 525° C. for from 2 hours to 15 hours, and compacting the sintered admixture under sufficient pressure and heat to form a compact of a desired density and configuration.

5. A process for preparing a zinc antimonide thermoelectric element comprising admixing substantially stoichiometric amounts of zinc and antimony of a fineness such that the particles will pass through a 200 mesh sieve, sintering the admixture in an inert atmosphere at a temperature of from 400° C. to 525° C. for from 2 hours to 15 hours, and compacting the sintered admixture at a temperature of from 480° C. to 520° C. at a pressure of from 2000 p.s.i. to 5000 p.s.i. to a desired configuration.

6. A process for preparing a zinc antimonide thermoelectric element comprising admixing substantially stoichiometric amounts of zinc and antimony in compactible particle form, sintering the admixture in an inert atmosphere at a temperature of from 400° C. to 525° C. for from 2 hours to 15 hours, and compacting the sintered admixture to a desired configuration, and sintering for from 2 hours to 15 hours at a temperature of from 400° C. to 525° C.

7. A process for preparing a thermoelectric element comprised of from 33% to 36% by weight, zinc, 64% to 67% by weight, antimony, 1% to 4% by weight, tin, and 0.1% to 0.5 by weight, silver, comprising admixing the zinc, antimony, tin and silver in compactible particle form, sintering the admixture in an argon atmosphere for from about 5 hours at a temperature of about 500° C. and pressing into a desired configuration at a temperature of about 520° C. and a pressure within the range of 3600 to 15,000 p.s.i.

8. A process for preparing a thermoelectric element comprised of from 33% to 36%, by weight, zinc, 64% to 67%, by weight, antimony, 1% to 4%, by weight, tin, and 0.1% to 0.5%, by weight, silver, comprising admixing the zinc, antimony, tin and silver in compactible particle form, sintering the admixture in an argon atmosphere for from about 5 hours at a temperature of about 500° C. and pressing into a desired configuration at a pressure within the range of 50 tons/in.$^2$ to 100 tons/in.$^2$ and sintering at a temperature of about 500° C. for about 2 hours.

9. A process for preparing a thermoelectric element comprised of 34.60%, by weight, zinc, 64.30%, antimony, 1.0%, by weight, tin, and 0.10%, by weight, silver, comprising admixing the zinc, antimony, tin and silver in compactible particle form, sintering the admixture in an argon atmosphere for from about 5 hours at a temperature of about 500° C. and pressing into the desired configuration at a temperature of about 520° C. and a pressure within the range of 3600 to 15,000 p.s.i.

10. A process for preparing a thermoelectric element comprised of 34.60%, by weight, zinc, 64.30%, by weight, antimony, 1.0%, by weight, tin, and 0.10%, by weight, silver, comprising admixing the zinc, antimony, tin and silver in compactible particle form, sintering the admixture in an argon atmosphere for from about 5 hours at a temperature of about 500° C. and pressing into a desired configuration at a pressure within the range of 50 tons per in.$^2$ to 100 tons per in.$^2$, and sintering at a temperature of about 480° C. for about 10 hours.

11. A thermoelement member suitable for use in a thermoelectric device comprised of a sintered compact comprised of an intermetallic material prepared in accordance with the process of claim 1.

References Cited in the file of this patent

UNITED STATES PATENTS 2,884,688 Herz ------------------ May 5, 1959